US008750793B2

(12) United States Patent
Tysowski

(10) Patent No.: US 8,750,793 B2
(45) Date of Patent: Jun. 10, 2014

(54) NEAR-FIELD COMMUNICATION (NFC) SYSTEM WITH MOBILE WIRELESS COMMUNICATIONS DEVICES DETERMINING GEOGRAPHIC POSITIONS OF NFC TAGS AND RELATED METHODS

(75) Inventor: Piotr Tysowski, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 373 days.

(21) Appl. No.: 12/904,365

(22) Filed: Oct. 14, 2010

(65) Prior Publication Data

US 2012/0094597 A1     Apr. 19, 2012

(51) Int. Cl.
*H04B 5/00* (2006.01)
(52) U.S. Cl.
USPC ... 455/41.1; 455/41.2; 455/456.3; 455/456.6; 455/411; 455/456.1; 340/10.1; 340/505; 340/572.1; 340/539.13; 340/5.8
(58) Field of Classification Search
USPC .......... 455/41.1, 456.3, 456.6, 414, 558, 410, 455/186.2, 553.1, 406, 408, 41.2, 466, 455/550.1, 412.1; 705/35, 39, 80, 41, 71, 705/17, 16, 18, 44, 20, 14.4, 2; 340/10.1, 340/5.21, 5.3, 572.7, 539.13
See application file for complete search history.

(56) References Cited

U.S. PATENT DOCUMENTS

| 6,405,125 | B1 | 6/2002 | Ayed | 701/200 |
|---|---|---|---|---|
| 6,750,769 | B1 | 6/2004 | Smith | 340/572.1 |
| 7,295,132 | B2 | 11/2007 | Steiner | 340/825.49 |
| 8,275,394 | B2 * | 9/2012 | Mattila et al. | 455/456.3 |
| 8,280,617 | B2 * | 10/2012 | Young et al. | 701/119 |
| 2007/0008140 | A1 * | 1/2007 | Saarisalo et al. | 340/572.7 |
| 2007/0103303 | A1 | 5/2007 | Shoarinejad | 340/572.1 |
| 2007/0167174 | A1 | 7/2007 | Halcrow et al. | 455/456.2 |
| 2007/0254676 | A1 * | 11/2007 | Pedigo et al. | 455/456.6 |

(Continued)

FOREIGN PATENT DOCUMENTS

| GB | 2466189 | 9/2008 | G01S 5/14 |
|---|---|---|---|
| WO | 2006/065839 | 6/2006 | G08B 1/08 |
| WO | 2007/079232 | 7/2007 | H04Q 7/38 |

OTHER PUBLICATIONS

Siira et al. "*Location-based Mobile Wiki using NFC Tag Infrastructure*" 2009 First International Workshop on Near Field communication: IEEE Computer Society 978-0-7695-3577-7/09.

(Continued)

*Primary Examiner* — Fayyaz Alam
*Assistant Examiner* — Ganiyu A Hanidu
(74) *Attorney, Agent, or Firm* — Allen, Dyer, Doppelt, Milbrath & Gilchrist, P.A.

(57) ABSTRACT

A near-field communication (NFC) system may include a plurality of geographically distributed NFC tags, and a tag geo-position database configured to store respective geographic positions of the NFC tags. The NFC system may further include a plurality of mobile wireless communications devices. Each of the mobile wireless communications devices may be configured to communicate with a given NFC tag when in proximity thereto, determine a current geographic position of the mobile wireless communications device, and communicate the determined current geographic position of the mobile wireless communications device to update the tag geo-position database.

14 Claims, 10 Drawing Sheets

(56) References Cited

U.S. PATENT DOCUMENTS

| | | | |
|---|---|---|---|
| 2007/0264974 A1 | 11/2007 | Frank et al. | 455/411 |
| 2008/0033652 A1* | 2/2008 | Hensley et al. | 702/5 |
| 2009/0111378 A1* | 4/2009 | Sheynman et al. | 455/41.1 |
| 2009/0131012 A1 | 5/2009 | Ashley, Jr. et al. | 455/404.2 |
| 2009/0203367 A1 | 8/2009 | Pamminger et al. | 455/414.3 |
| 2010/0079249 A1 | 4/2010 | Pan | 340/10.1 |
| 2011/0087887 A1* | 4/2011 | Luft et al. | 713/178 |
| 2011/0148625 A1* | 6/2011 | Velusamy | 340/539.13 |

OTHER PUBLICATIONS http://giswww1.bcit.ca/georanger/find-indoor-loc.htm.

Bonino et al. "*Tracking and Position Recognition Applied to Remote Monitoring to be Used in Integrated Safeguards*" http://200.0.198.11/MenoriaT/Mt00/Mt29-00.pdf.

"*Friendticker*"Impressum Servtag © 2009-2010 Servtag GmbH. Alle Rechte vorbehalten.

U.S. Appl. No. 12/857,732, filed Aug. 7, 2010, Griffin et al.

U.S. Appl. No. 12/904,336, filed Oct. 14, 2010, Tysowski.

\* cited by examiner

NEAR-FIELD COMMUNICATION (NFC) SYSTEM WITH MOBILE WIRELESS COMMUNICATIONS DEVICES DETERMINING GEOGRAPHIC POSITIONS OF NFC TAGS AND RELATED METHODS

TECHNICAL FIELD

This application relates to the field of communications, and more particularly, to mobile wireless communications devices and related methods that use Near Field Communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
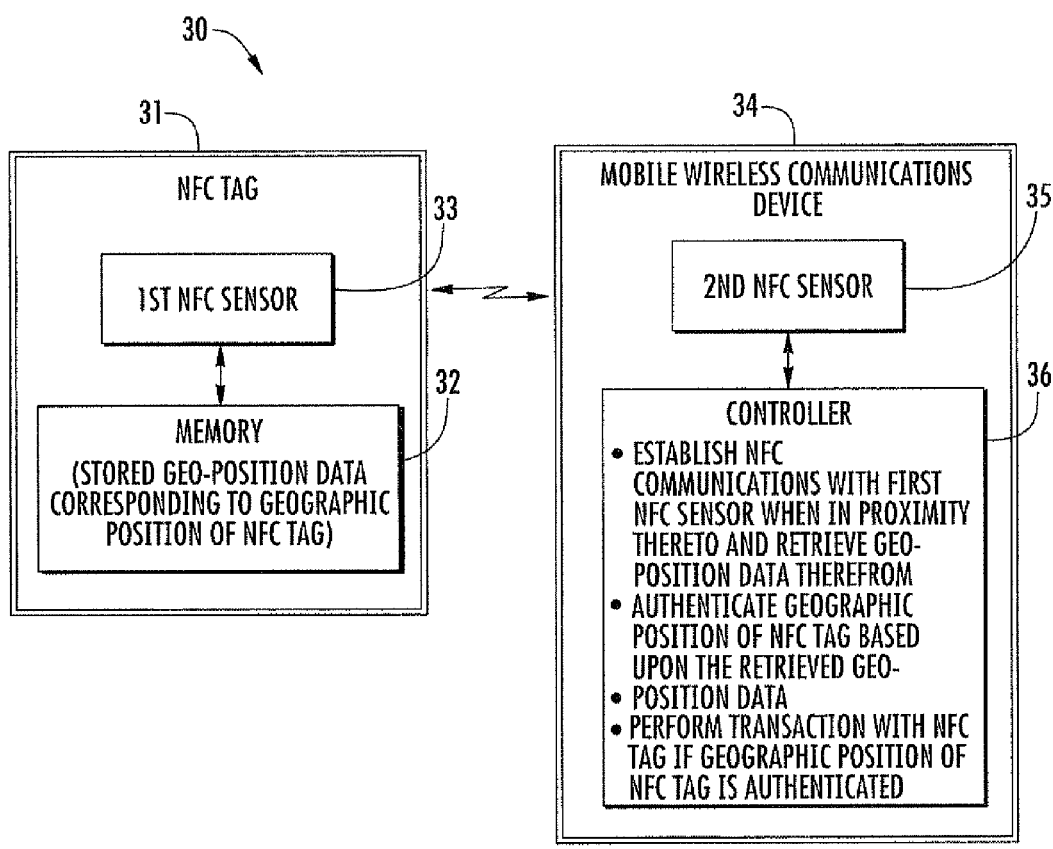
FIG. 1 is a schematic block diagram of a near field communication (NFC) system providing NFC tag authentication based upon geographic position in accordance with an example embodiment.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a near-field communication (NFC) system is disclosed herein which may include a plurality of geographically distributed NFC tags, and a tag geo-position database configured to store respective geographic positions of the NFC tags. The NFC system may further include a plurality of mobile wireless communications devices. Each of the mobile wireless communications devices may be configured to communicate with a given NFC tag when in proximity therewith, determine a current geographic position of the mobile wireless communications device, and communicate the determined current geographic position of the mobile wireless communications device to update the geo-position database. As such, the geographic positions of the NFC tags may advantageously be provided by mobile wireless communications devices that interact with the NFC tags after deployment, which may advantageously reduce the time and expense associated with deployment of the NFC tags, as well as facilitating the addition of new NFC tags to the system or redeployment of the NFC tags to different geographical positions as necessary.

More particularly, the tag geo-position database may be configured to update the stored geographic position for the given NFC tag based upon a plurality of determined current geographic positions from different mobile wireless communications devices. Additionally, each mobile wireless communications device may further include a position determining device, such as a global positioning system (GPS) device, for example.

Each mobile wireless communications device may further include a wireless transceiver, such as a cellular transceiver, for example. The wireless transceiver may be configured to communicate with the tag geo-position database. Furthermore, each NFC tag may include a first NFC circuit, and each mobile wireless communications device may include a controller and a second NFC circuit coupled thereto for communicating with the first NFC circuit. Also, the controller may be configured to communicate with the tag geo-position database via the first NFC circuit.

A related communications method may include communicating between a mobile wireless communications device and a given near-field communication (NFC) tag from among a plurality of geographically distributed NFC tags when the mobile wireless communications device is in proximity to the given NFC tag. The method may further include determining a current geographic position of the mobile wireless communications device, and communicating the determined current geographic position of the mobile wireless communications device to update a tag geo-position database configured to store respective geographic positions of the NFC tags.

A related computer-readable medium may have computer-executable instructions for causing a mobile wireless communications device to perform steps comprising communicating with a given near-field communication (NFC) tag from among a plurality of geographically distributed NFC tags when in proximity thereto, determining a current geographic position of the mobile wireless communications device, and communicating the determined current geographic position of the mobile wireless communications device to update a tag geo-position database configured to store respective geographic positions of the NFC tags.

Referring initially to FIGS. 1 through 4, a near-field communication (NFC) system 30 illustratively includes an NFC tag 31 including a memory 32 configured to store geo-position data corresponding to a geographic position of the NFC tag (Blocks 50' and 57' of FIG. 4), and a first NFC sensor 33 coupled to the memory 32 and the first NFC sensor 33 being configured to initiate a transaction based upon NFC communications, as will be discussed further below. By way of example, the geo-position data may be stored in an NFC record type definition (RTD) field in an NFC Data Exchange Format (NDEF), although other suitable formats are also possible. The system 30 further illustratively includes a mobile wireless communications device 34 (also referred to as a "mobile device" herein) including a second NFC sensor 35 and a controller 36 coupled thereto.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The controller 36 is configured to cause the second NFC sensor 35 to establish NFC communications with the first NFC sensor 33 when in proximity thereto and retrieve the geo-position data therefrom, at Blocks 51-52. By way of example, the geo-position data may comprise position coordinates, such as latitude/longitude coordinates or scalar values, for example. Another approach is that the geo-position data may comprise a unique identification (ID) associated with a geographic position.

Figure 2:
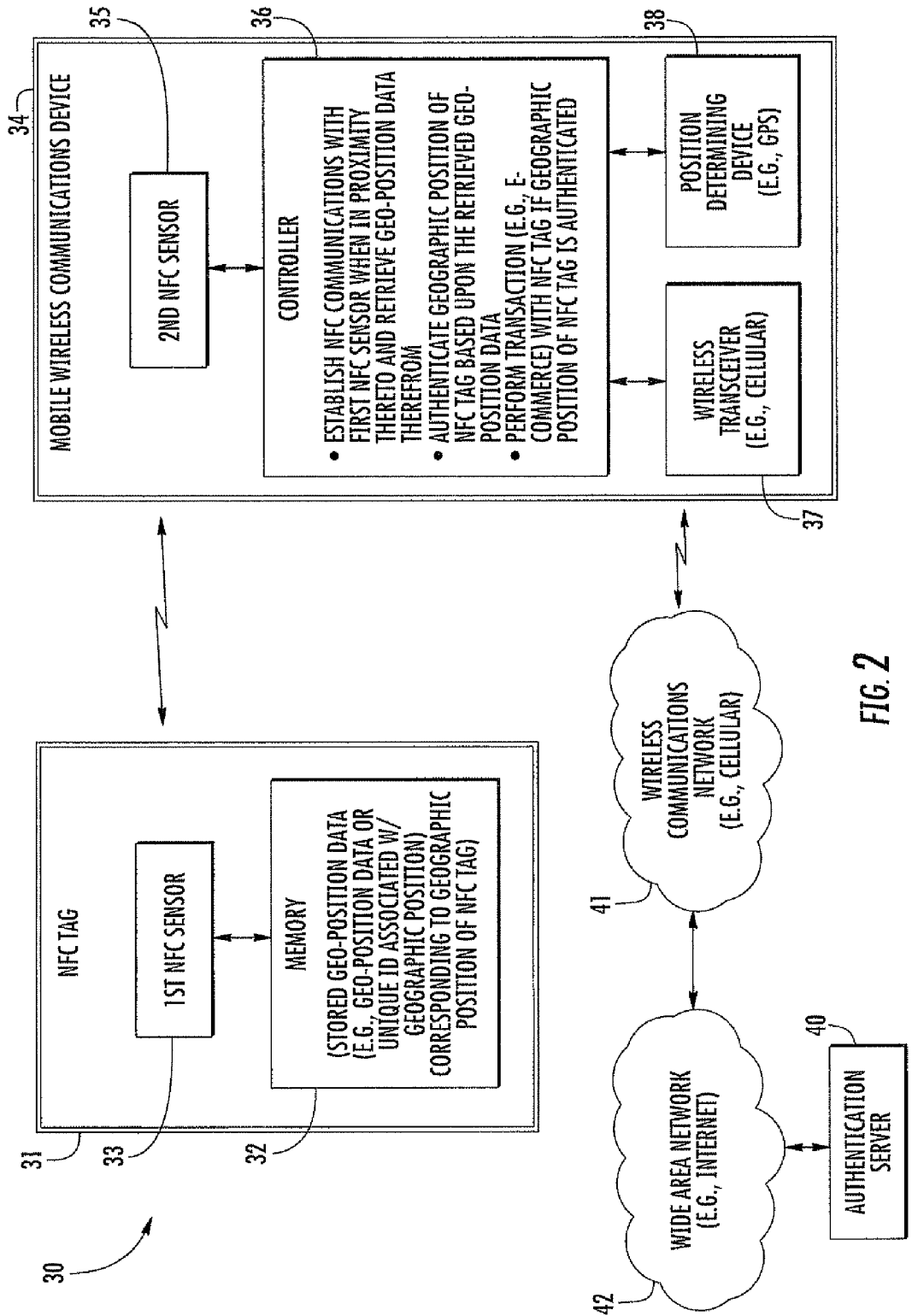
FIG. 2 is a schematic block diagram showing the system of FIG. 1 in greater detail.

By way of example, as seen in FIG. 2, the mobile device 34 further illustratively includes a wireless transceiver 37 and a position determining device 38 both coupled to the controller 36. For example, the wireless transceiver 37 may comprise a cellular transceiver, although other suitable wireless communications formats (e.g., wireless LAN, WiMAX, etc.) may also be used. Moreover, the position determining device 38 may comprise a global positioning system (GPS) receiver, for example, although other suitable formats such as Galileo, GLONASS, etc., may also be used.

The unique ID may identify the NFC tag 31 itself (e.g., a serial number), or it may be a translated or encoded version of position coordinates. Thus, the unique ID may be used to inform the mobile device 34 where the mobile device 34 is supposed to be located, or corresponding position coordinates for the unique ID may be stored in an authentication server 40 with which the controller 36 communicates via the wireless transceiver 37, a wireless communications network 41 (e.g., a cellular network), and a wide area network (WAN) 42, such as the Internet. For example, the geographic position for the NFC tag 31 may be stored in a database at the authentication server 40 along with the unique ID. Using a unique ID to determine the appropriate position of given NFC tag may be advantageous in some implementation because of the relatively small memories provided on some NFC tags. For example, some NFC tags may have a 2 KB memory capacity or less, so using a relatively small unique ID helps to conserve the memory resources on the NFC tag for other data.

The controller 36 is also configured to authenticate a geographic position of the NFC tag 31 based upon the retrieved geo-position data, at Block 53. This may be done in a variety of ways. For example, if the geo-position data stored in the memory 32 comprises position coordinates, then when the position coordinates are retrieved by the controller 36, the controller may then compare the retrieved position coordinates with a current geographic position provided by the position determining device 38 (Block 53'). If the two sets of position coordinates are within a threshold distance of one another, then the position of the NFC tag 31 is authenticated. In embodiments where the mobile device 34 does not include a position determining device 38, position coordinates of the mobile device 34 may be provided by the wireless communications network 41 (such as from cellular or WiFi access point triangulation) to the controller 36 to compare with the retrieved geographic position coordinates of the NFC tag 31.

In other embodiments, the authentication of the geographic position of the NFC tag 31 may be performed by the authentication server 40. That is, the controller 36 may be further configured to communicate with the authentication server 40 via the wireless transceiver 37 and wireless communications network 41 (and, if appropriate, the wide area network 42) to authenticate the geographic position of the NFC tag 31. For example, if the geo-position data stored in the memory 32 is a unique ID corresponding to geographic position coordinates for the NFC tag stored at the authentication server 40, then the authentication server may compare these coordinates with the current position of the mobile device 34 (which may be obtained from the position determining device 38, triangulation, etc.) to authenticate the geo-position data, and more particularly, the geographic position of the NFC tag 31.

Figure 3:
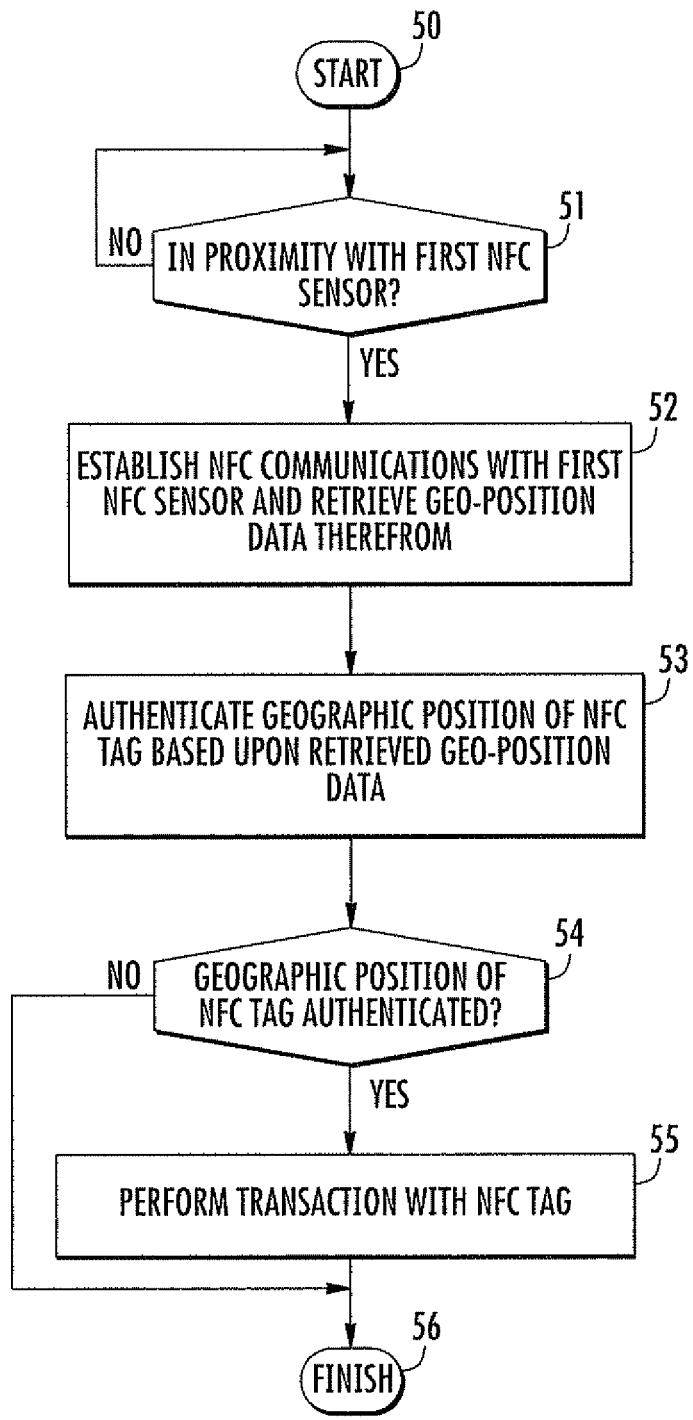
FIGS. 3 and 4 are flow diagrams illustrating method aspects associated with the systems of FIGS. 1 and 2.
Figure 4:
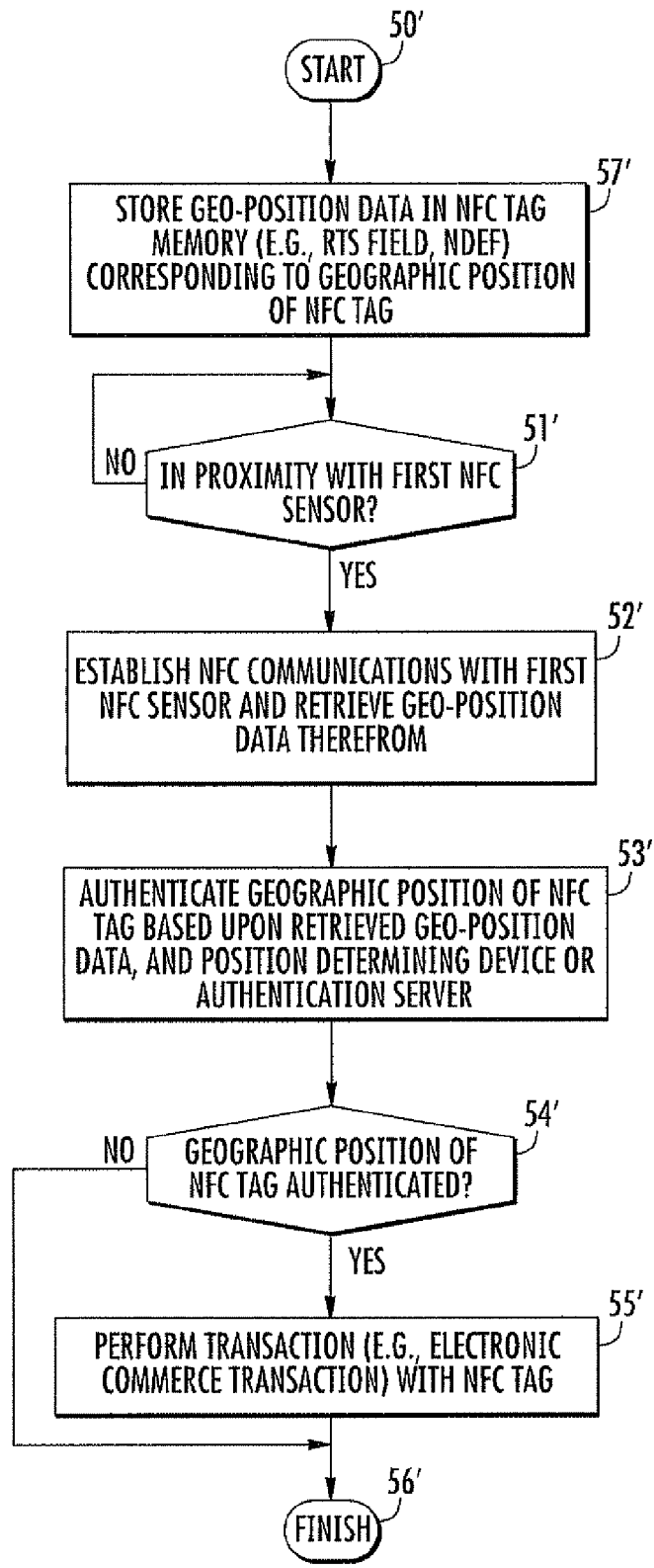
Figure 5:
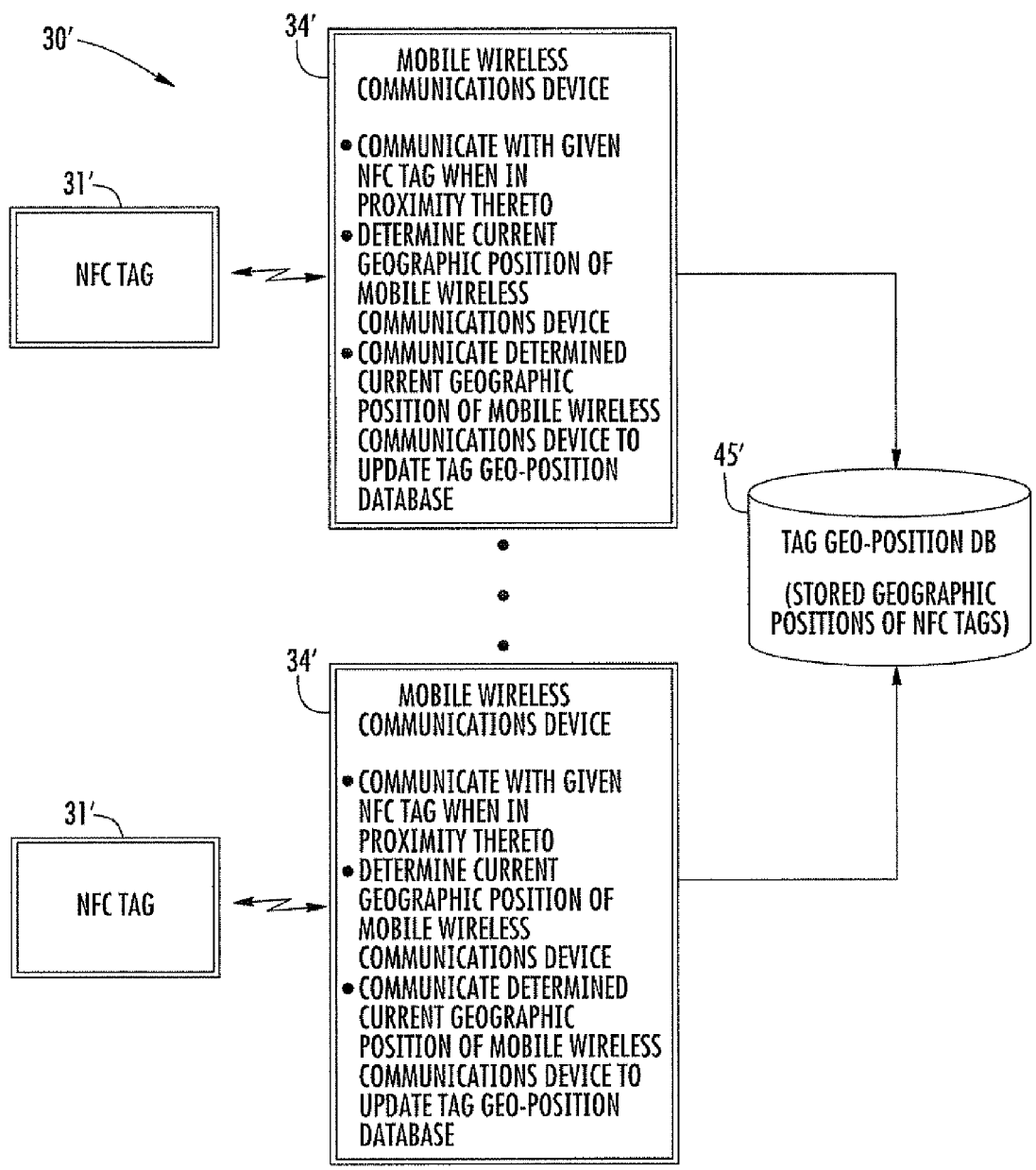
FIG. 5 is a schematic block diagram of an NFC system in accordance with an alternative embodiment providing NFC tag geographic position determination.

If the geographic position of the NFC tag 31 is authenticated, at Block 54, then the controller 36 performs the above-noted transaction with the NFC tag 31, at Block 55, thus concluding the method illustrated in FIG. 3 (Block 56). Otherwise, the controller 36 may avoid performing or participating in the transaction with the NFC tag 31, and may also discontinue NFC communications with the NFC tag. By way of example, the transaction may be an electronic commerce (e-commerce) transaction, such as if the NFC tag 31 is part of a ticket sales terminal, a terminal for paying fees or fares, etc. Other types of transactions may include opening a link in a web browser (the link being provided by the NFC tag 31, typically to view an advertisement—called a "smart poster"), pairing with a Bluetooth device to begin a Bluetooth session, reading a phone number to initiate a call or SMS, downloading a ringtone from the tag, etc. Also, the NFC tag 31 may provide a clue as to the precise whereabouts of the mobile device 34 to help speed up GPS acquisition. More particularly, when a GPS receiver is missing, or has inaccurate estimates of, its position, velocity, or the current time, the receiver will then systematically search for all possible satellites to obtain this information, which significantly increases a time to first fix (TTFF) of the current location. However, providing initial estimates of one or more of these values may provide a significant reduction in the TTFF.

Authenticating the geographic position of the NFC tag 31 prior to engaging in a transaction therewith helps ensure that the NFC tag 31 is most likely in a geographic position assigned to the NFC tag 31 for security purposes, for example. That is, this authentication advantageously helps ensure that a "dummy" or otherwise unauthenticated tag is not surreptitiously set up to defraud or scam mobile device users, but is instead a valid terminal known to be deployed by a trusted source (e.g., corporation, government, etc.) at the designated location. In some embodiments, both a unique ID and position coordinates may be verified for added security. Also, this technique helps prevent a valid NFC tag from being stolen and re-located from its authorized location by a malicious party (and result in an unauthorized transaction taking place).

In accordance with an alternative embodiment now described with reference to FIGS. 5 through 8, an NFC system 30' illustratively includes a plurality of geographically distributed NFC tags 31', and a tag geo-position database 45' configured to store respective geographic positions of the NFC tags. As discussed above, the stored geographic positions may be latitude/longitude positions, for example.

The NFC system 30' further illustratively includes a plurality of mobile devices 34'. As similarly described above, each mobile device 34' is configured to communicate with a given NFC tag 31' when in proximity thereto, at Blocks 80-82, and determine its respective current geographic position, at Block 83. That is, upon initiating NFC communications with a respective NFC tag 31', each mobile device 34' may determine its current geographic position, for example, based upon a position determining device 38' thereof (if provided), or from a wireless communications network 41' (e.g., from triangulation), as discussed above. Considered alternatively, when a mobile device 34' is in sufficient proximity to communicate with a given NFC tag 31', their respective geographical positions may effectively be the same. That is, the above-described effective communication range for NFC may be much less than the margin of error of a typical position determining device, so when the two are engaged in NFC communications their respective geographic positions may be considered to be the same. It should be noted that the location of an NFC tag 31' may only need to be recorded when the NFC tag does not yet already have a location in its memory, or it has a location but it does not match the mobile device's location (through GPS) and there is a discrepancy that needs to be corrected. That is, once the location of a given NFC tag 31' is generally known, it need not be reported endlessly.

Figure 8:
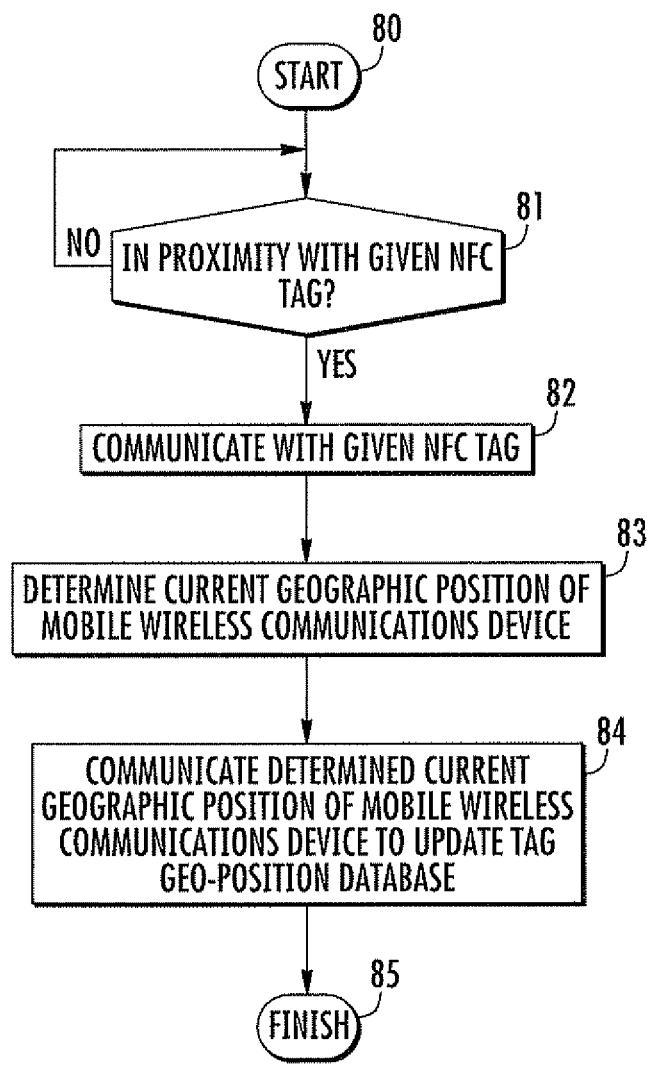
FIGS. 8 and 9 are flow diagrams illustrating method aspects associated with the systems of FIGS. 5-7.
Figure 9:
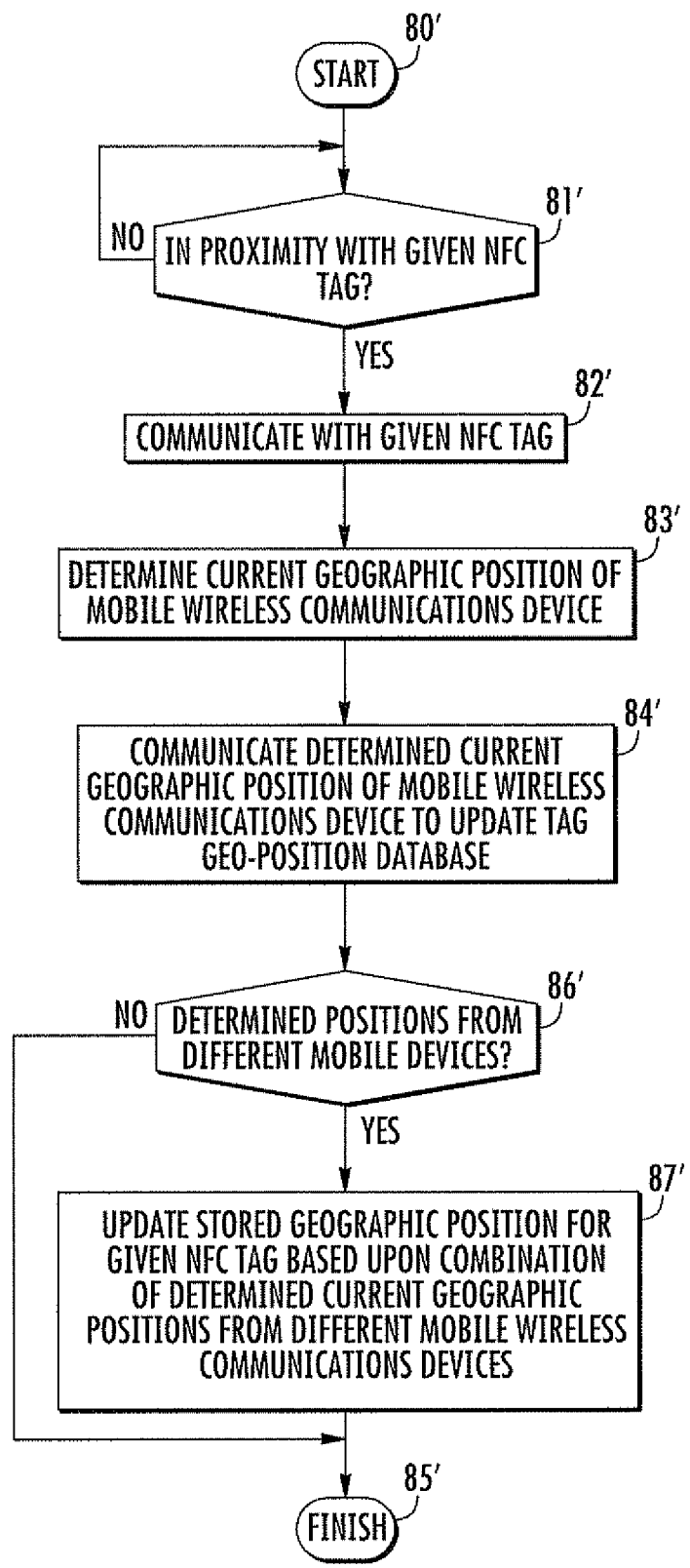

Accordingly, the determined current geographic position of a mobile device 34' may be used to update the geo-position database 45', i.e., to provide this determined geographic position as the geographic position of the given tag 31', at Block 84, thus concluding the method illustrated in FIG. 8 (Block 85). As such, the geographic positions of the NFC tags 31' may advantageously be provided by mobile devices 34' that interact with the NFC tags after deployment, which may advantageously reduce the time and expense associated with deployment of the NFC tags. That is, the NFC tags 31' merely need to be positioned in the desired location, and through normal interaction with mobile devices 34' their respective geographic positions will be populated in the tag geo-position database 45'. This may also advantageously facilitate the addition of new NFC tags 31' to the system 30', or redeployment of NFC tags to different geographical positions as necessary.

In some embodiments, the tag geo-position database 45' may be configured to update the stored geographic position for a given NFC tag 31' based upon a plurality of determined current geographic positions from different mobile devices 34', at Blocks 86'-87'. That is, the tag geo-position database 45' may continue to refine the geographic position for a given NFC tag 31' as the tag geo-position database 45' receives new geographic position coordinates for different mobile devices 34'. For example, if an initial geographic position estimate for the given NFC tag 31' is generated through triangulation, the accuracy of this position estimate may be fairly low. However, as one or more mobile devices 34' with position determining devices 38' (e.g., GPS) relay geographic position coordinates for the given NFC tag 31', which are typically much more accurate than those obtained from triangulation, then the geo-position database 45' may advantageously be updated to reflect the more accurate coordinates. This may be done by averaging the coordinates, or replacing prior stored coordinates with new ones known to have a greater accuracy. In addition, mobile devices using different location technologies may report the respective location technology being used, or an expectation of its accuracy. This may add weight to reports made using more accurate techniques such as GPS, and less weight to less accurate methods like cell tower positioning, in the averaging calculation performed at the tag geo-position database 45', the stored coordinates may comprise a weighted average of several coordinates.

Figure 6:
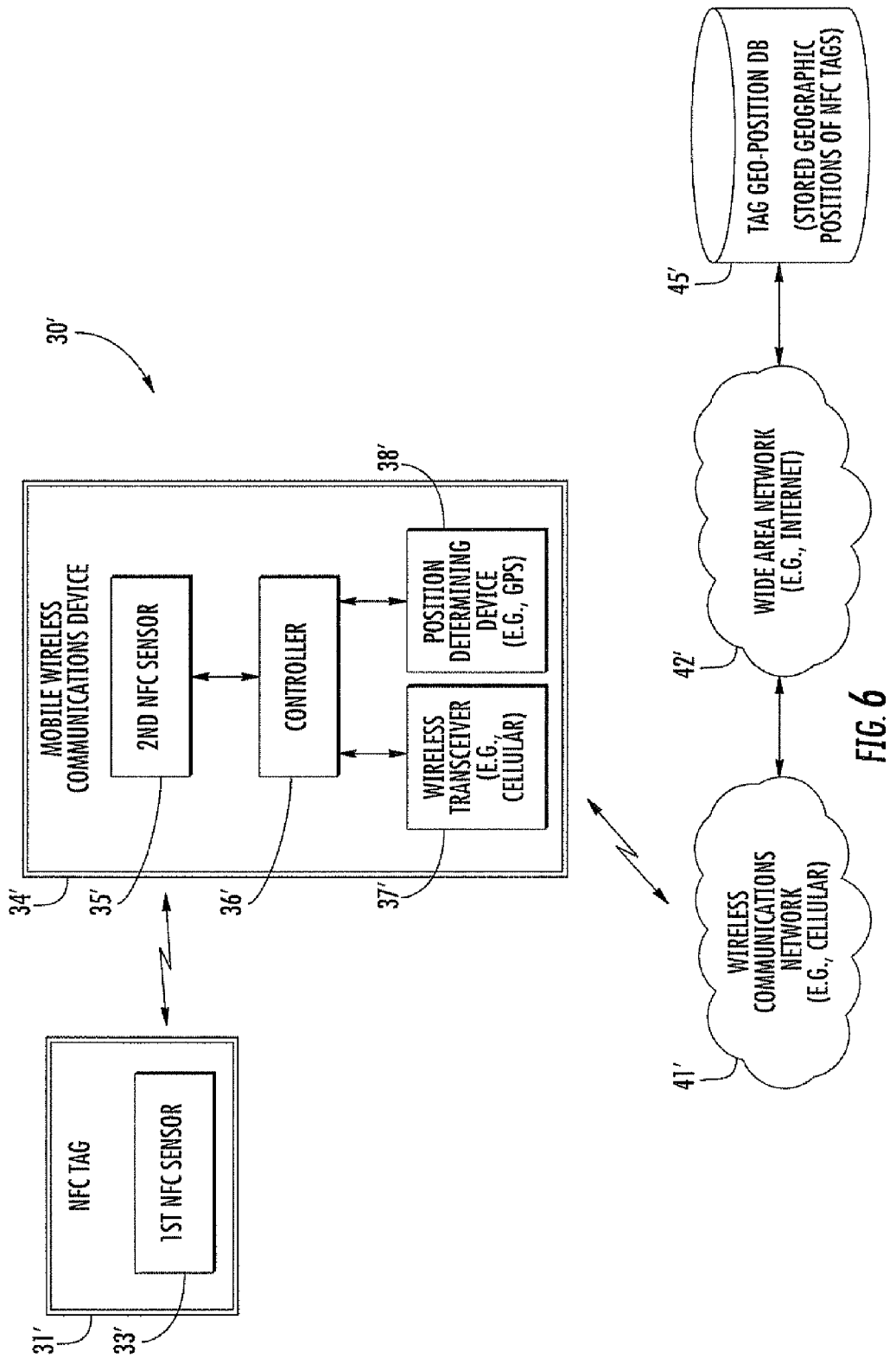
FIG. 6 is a schematic block diagram showing the system of FIG. 5 in greater detail.
Figure 7:
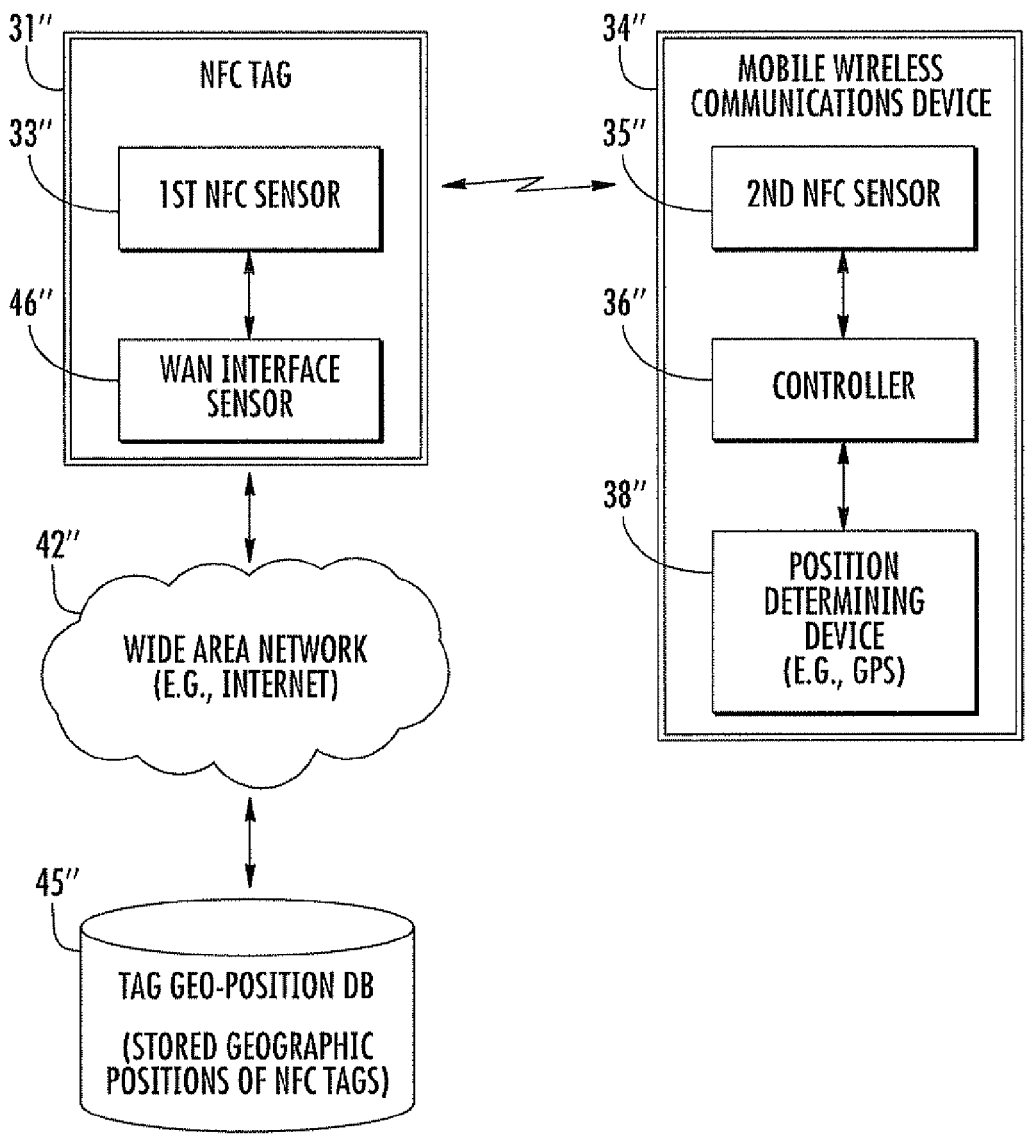
FIG. 7 is a schematic block diagram of an alternative embodiment of the system of FIG. 6.

In the example embodiment of FIG. 6, the controller 36' communicates with the tag geo-position database 45' via its wireless transceiver 37'. However, in other embodiments, such as the one shown in FIG. 7, the mobile device 34", and the controller 36" may instead communicate with the tag geo-position database 45" via the NFC tag 31", which further includes a WAN interface 46" for interfacing the WAN 42". That is, the mobile device 34" may communicate with the tag geo-position database 45" via the NFC tag 31", or the NFC tag may communicate with the geo-position database directly, with the mobile device assisting by providing a precise location (such as with GPS).

Associating geographic positions with NFC tags, as described above, may advantageously allow other operations to be performed. By way of example, an NFC tag may have available Wi-Fi access point information stored therein along with its respective geographic location. The mobile device may then use a map application to indicate where the access points (or other services) are located. Another operation is using the geographic position of an NFC tag at a landmark to geocode information on the mobile device (e.g., geocode a picture taken in that location by swiping the mobile device with the NFC tag).

Yet another advantageous aspect is that of associating geographic position information with contacts, etc., for reader-to-reader applications. Thus, for example, when contact information is exchanged between mobile devices at a particular location, such as a trade show, etc., the location of the exchange is recorded along with the contact, allowing all contacts obtained from that location to be searched and grouped together accordingly. Another approach is to use the geographic position in an NFC tag to generate calendar appointments. For example, swiping a mobile device to an NFC tag at a doctor's office may assign a calendar entry to the mobile device with location information included for a next appointment.

Still another advantageous aspect of storing geographic position information for an NFC tag is that the NFC tag may be positioned at a location to convey direction information within a building, etc., where satellite position information is not available. For example, an NFC tag with its respective geographic position information stored therein may be positioned at a gate in an airport that faces north. When an arriving passenger exits the gate, swiping the NFC tag with the mobile device allows directions to be provided based upon the direction the mobile device is facing at that particular moment (i.e., north), so that the mobile device may present a prompt requesting a user of the mobile device to go "right" or "left" depending on whether the user's next destination is a connecting flight, ground transportation, etc. Such information is typically more helpful inside of a building than "east" or "west" directions, for example, as the direction of east or west within a building may not be readily apparent.

Still another application is storing multiple geographic positions on an NFC tag. By way of example, for an NFC tag at a customer service or point of sale (POS) station, if a user swipes this NFC tag with a mobile device and the station in unattended or closed, directions to another station (e.g., the next closest station) are provided. Similarly, recording the location at a POS terminal may be used to later search a sales transaction by location, for expense reporting purposes, etc.

Example components of a mobile wireless communications device 1000 that may be used in accordance with the above-described embodiments are further described below with reference to FIG. 10. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 10:
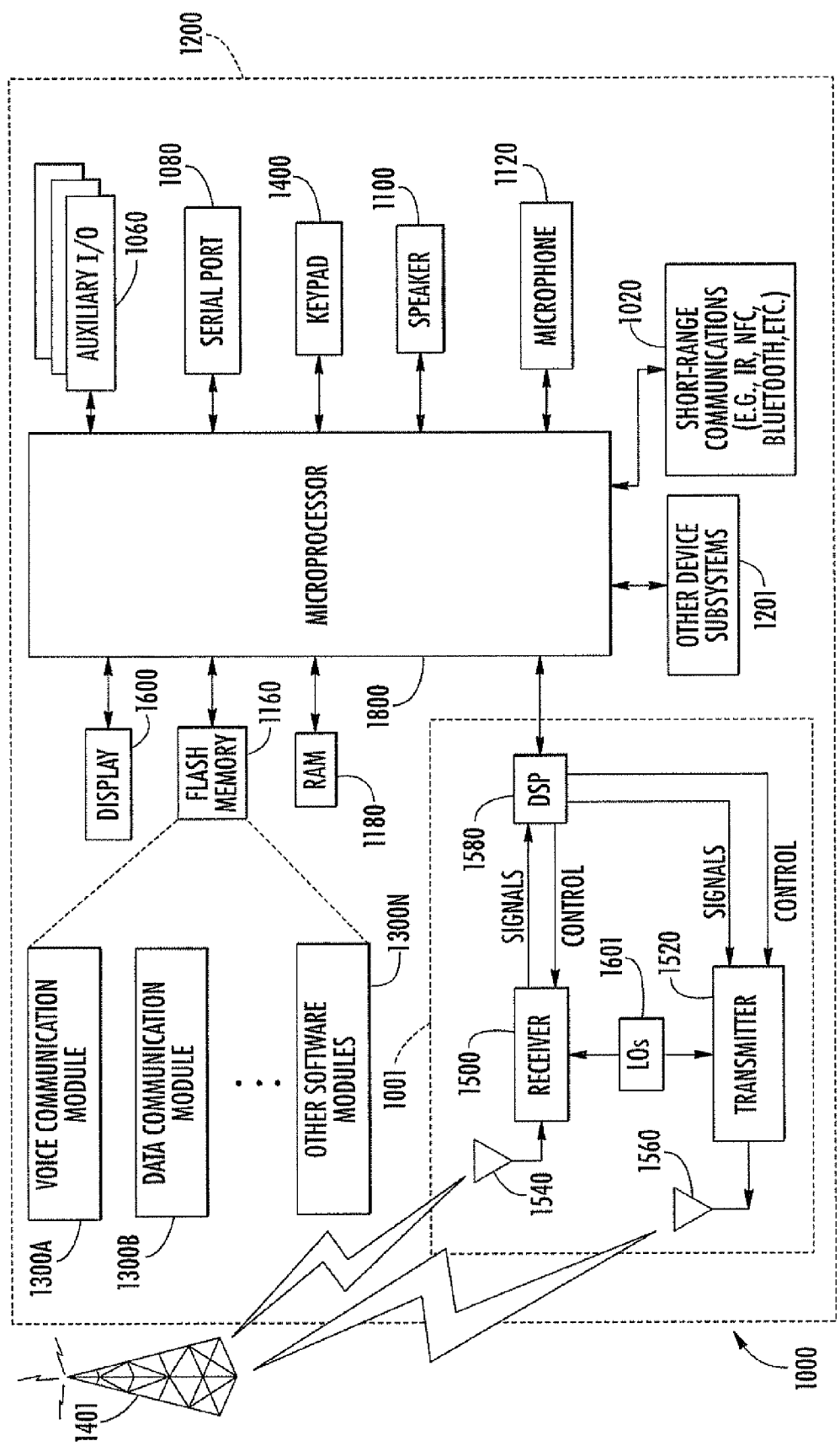
FIG. 10 is a schematic block diagram illustrating example components of a mobile wireless communications device that may be used with the example NFC systems of FIGS. 1-2 and 5-7.

In addition to the processing device 1800, other parts of the mobile device 1000 are shown schematically in FIG. 10. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device for use in a near-field communication (NFC) system that includes a plurality of geographically distributed NFC devices, each NFC device comprising a first NFC sensor, and a geo-position database configured to store respective geographic positions of said NFC devices, the mobile wireless communications device comprising:
a wireless transceiver, a controller and a second NFC sensor coupled thereto, and configured to
communicate with the first NFC sensor of a given NFC device via the second NFC sensor when in proximity thereto,
determine a current geographic position of said mobile wireless communications device, and
communicate the determined current geographic position of said mobile wireless communications device via the wireless transceiver to update the stored geographic position of the given NFC device in said geo-position database.

2. The mobile wireless communications device of claim 1 wherein said geo-position database is configured to update the stored geographic position for said given NFC device based upon a plurality of determined current geographic positions from different mobile wireless communications devices.

3. The mobile wireless communications device of claim 1 wherein the mobile wireless communications device further comprises a position determining device.

4. The mobile wireless communications device of claim 3 wherein said position determining device comprises a global positioning system (GPS) device.

5. The mobile wireless communications device of claim 1 wherein the wireless transceiver further comprises a cellular transceiver.

6. The mobile wireless communications device of claim 1 wherein the wireless transceiver further comprises a wireless local area network (WLAN) transceiver.

7. A communications method comprising:
communicating between a mobile wireless communications device and a given near-field communication (NFC) device from among a plurality of geographically distributed NFC devices when the mobile wireless communications device is in proximity to the given NFC device, each NFC device comprising a first NFC sensor, and the mobile wireless communications device comprising a wireless transceiver, a controller and a second NFC sensor coupled thereto for communicating with the first NFC sensor;
determining a current geographic position of the mobile wireless communications device; and
communicating the determined current geographic position of the mobile wireless communications device via the wireless transceiver to update a stored geographic position of a given NFC device in a geo-position database configured to store respective geographic positions of the NFC devices.

8. The method of claim 7 further comprising updating the stored geographic position for the given NFC device based upon a plurality of determined current geographic positions from different mobile wireless communications devices.

9. The method of claim 7 wherein the mobile wireless communications device comprises a position determining device; and wherein determining comprises determining the current geographic position of the mobile wireless communications device based upon its position determining device.

10. The method of claim 7 wherein the position determining device comprises a global positioning system (GPS) device.

11. A non-transitory computer-readable medium having computer-executable instructions for causing a mobile wireless communications device, comprising a wireless transceiver, a controller and a second NFC sensor coupled thereto, to perform steps comprising:
communicating with a given near-field communication (NFC) device from among a plurality of geographically distributed NFC devices when in proximity thereto, the NFC device comprising a first NFC sensor for communicating with the second NFC sensor;
determining a current geographic position of the mobile wireless communications device; and
communicating the determined current geographic position of the mobile wireless communications device via the wireless transceiver to update a stored geographic position of a given NFC device in a geo-position database configured to store respective geographic positions of the NFC devices.

12. The non-transitory computer-readable medium of claim 11 wherein the geo-position database is configured to update the stored geographic position for the given NFC device based upon a plurality of determined current geographic positions from different mobile wireless communications devices.

13. The non-transitory computer-readable medium of claim 11 wherein the mobile wireless communications device comprises a position determining device; and wherein determining comprises determining the current geographic position of the mobile wireless communications device based upon its position determining device.

14. The non-transitory computer-readable medium of claim 13 wherein the position determining device comprises a global positioning system (GPS) device.

* * * * *